United States Patent
Chatroux et al.

(10) Patent No.: US 11,614,228 B2
(45) Date of Patent: Mar. 28, 2023

(54) DEVICE FOR CONVERTING A LIQUID TO A VAPOUR

(71) Applicant: COMMISSARIAT A L'ENERGIE ATOMIQUE ET AUX ENERGIES ALTERNATIVES, Paris (FR)

(72) Inventors: André Chatroux, Tullins (FR); Michel Planque, Seyssins (FR); Magali Reytier, Villard de Lans (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 492 days.

(21) Appl. No.: 16/088,884

(22) PCT Filed: Mar. 27, 2017

(86) PCT No.: PCT/FR2017/050696
§ 371 (c)(1),
(2) Date: Sep. 27, 2018

(87) PCT Pub. No.: WO2017/178725
PCT Pub. Date: Oct. 19, 2017

(65) Prior Publication Data
US 2019/0107277 A1    Apr. 11, 2019

(30) Foreign Application Priority Data

Apr. 13, 2016 (FR) ...................................... 1653237

(51) Int. Cl.
*F22B 1/28* (2006.01)
*F22B 1/02* (2006.01)
*F22B 27/16* (2006.01)

(52) U.S. Cl.
CPC .............. *F22B 1/285* (2013.01); *F22B 1/021* (2013.01); *F22B 1/282* (2013.01); *F22B 1/288* (2013.01); *F22B 27/16* (2013.01)

(58) Field of Classification Search
CPC .......... F22B 1/021; F22B 1/288; F22B 1/285; F22B 1/282; F22B 27/16; A61M 15/0003;
(Continued)

(56) References Cited

U.S. PATENT DOCUMENTS 2,059,408 A * 11/1936 Stark .......................... F24F 6/12
261/128
2,095,017 A * 10/1937 Wilkes ..................... F24H 4/04
122/15.1
(Continued)

FOREIGN PATENT DOCUMENTS

DE    202010010108 U1    10/2010
FR    595069 A    9/1925
WO    WO-97/33479 A1    9/1997

OTHER PUBLICATIONS

International Search Report issued in PCT Patent Application No. PCT/FR2017/050696 dated May 18, 2017.

*Primary Examiner* — Eric S Stapleton
(74) *Attorney, Agent, or Firm* — Marshall, Gerstein & Borun LLP

(57) ABSTRACT

A device for converting a liquid into vapor includes an enclosure, a heating surface with a downward slope arranged in the enclosure, and a liquid inlet port connected to an upper portion of the heating surface so that a liquid introduced from the liquid inlet port flows on the heating surface. The device also includes a vapor outlet port formed through a wall of the enclosure. The heating surface includes a heat transfer pipe configured to allow the flowing of a heat transfer fluid to heat the heating surface, and a corner piece including a U-shaped cross-section with a semi-circular (Continued)

portion arranged around the heat transfer pipe and an upper portion forming an opening on the enclosure.

19 Claims, 3 Drawing Sheets

(58) Field of Classification Search
CPC ............ A61M 15/0041; A61M 11/042; A61M 15/0035; A61M 15/06; A61M 2016/0024; A61M 2205/8206; A61M 2205/8243; A61M 2016/0021; A61M 2205/582; A61M 2205/3653; A61M 2205/13; A61M 2205/581; A61M 2205/3368; A61M 2205/584; A61M 2016/0036; A24D 1/14; A24D 1/002; A24D 1/20; A24B 3/14; A24B 13/02; H05B 3/46; A24F 40/46; A24F 47/008; A24F 40/20
USPC .................................................. 392/402, 404
See application file for complete search history.

(56) References Cited

U.S. PATENT DOCUMENTS

| | | | | |
|---|---|---|---|---|
| 2,781,174 | A * | 2/1957 | Smith | F24D 3/08 237/8 C |
| 3,216,403 | A * | 11/1965 | Kollerup | F22D 11/00 122/451 S |
| 3,830,705 | A * | 8/1974 | Dewegeli | B01D 3/02 202/189 |
| 3,873,022 | A * | 3/1975 | Hilgemann | F24F 11/83 237/8 R |
| 4,032,748 | A * | 6/1977 | Vischer | A47J 31/542 392/396 |
| 4,054,122 | A * | 10/1977 | Reed | F24F 6/04 126/113 |
| 4,106,692 | A * | 8/1978 | Baier | F24D 3/08 126/400 |
| 4,256,081 | A * | 3/1981 | Stover | F24D 9/00 126/101 |
| 4,339,307 | A * | 7/1982 | Ellis, Jr. | C02F 1/18 202/176 |
| 4,957,214 | A * | 9/1990 | Lenny | B65D 88/34 137/172 |
| 5,870,524 | A * | 2/1999 | Swiatosz | F41H 9/06 392/394 |
| 5,937,141 | A * | 8/1999 | Swiatosz | F22B 1/282 392/397 |
| 6,290,819 | B1 * | 9/2001 | Land | C02F 1/04 202/83 |
| 6,393,212 | B1 * | 5/2002 | Hutchinson | F04B 19/027 392/471 |
| 6,647,204 | B1 * | 11/2003 | Hutchinson | A47L 11/34 15/320 |
| 6,734,405 | B2 * | 5/2004 | Centanni | A61L 2/07 219/628 |
| 6,846,388 | B2 * | 1/2005 | Wilks | B01D 1/0017 126/232 |
| 7,413,634 | B1 * | 8/2008 | Napier | B01D 3/146 202/153 |
| 7,726,298 | B2 * | 6/2010 | St. Denis | F24H 1/208 126/391.1 |
| 8,418,718 | B2 * | 4/2013 | Hebblethwaite | B65D 90/24 137/584 |
| 9,702,583 | B2 * | 7/2017 | Dobi | F22D 3/02 |
| 10,773,880 | B2 * | 9/2020 | Thiessen | F24H 1/205 |
| 2002/0023919 | A1 * | 2/2002 | Toya | H05B 3/46 219/544 |
| 2003/0230567 | A1 * | 12/2003 | Centanni | F22B 1/281 219/628 |
| 2004/0182855 | A1 * | 9/2004 | Centanni | F22B 1/282 219/628 |
| 2005/0095168 | A1 * | 5/2005 | Centanni | H05B 6/108 422/3 |
| 2006/0037539 | A1 * | 2/2006 | Toda | C23C 16/40 118/726 |
| 2006/0196958 | A1 * | 9/2006 | Dancey | F24D 12/00 237/67 |
| 2008/0173260 | A1 * | 7/2008 | Lange | F28D 15/06 122/31.1 |
| 2013/0220237 | A1 * | 8/2013 | Dobi | F22D 3/02 122/18.1 |
| 2015/0020823 | A1 * | 1/2015 | Lipowicz | A24B 15/167 131/328 |
| 2015/0108109 | A1 * | 4/2015 | Menashes | A47J 27/21016 219/441 |
| 2015/0165146 | A1 * | 6/2015 | Bowman | A61M 16/16 128/203.14 |

* cited by examiner

DEVICE FOR CONVERTING A LIQUID TO A VAPOUR

TECHNOLOGICAL FIELD

The description relates to the field of vapor generators, and particularly to vapor generators used for high-temperature electrochemical converters (HTSE). The description more specifically relates to a device for converting a liquid into vapor using as energy a heat transfer fluid capable of supplying a low vapor flow rate, particularly, a vapor flow rate particularly in the range from 10 g/hr to 10 kg/hr and operating a constant pressure, particularly at the atmospheric pressure or under a few tens of bars.

BACKGROUND

A high temperature steam electrolyzer (HTSE) is an electrochemical device for generating hydrogen from steam by application of an electric current to a stack of electrolytic cells electrically connected in series and each formed of two electrodes, that is, a cathode and an anode, with an interposed solid oxide electrolytic membrane. Generally, steam is introduced at the cathode of each cell powered with electricity, and a reaction of electrochemical reduction of the steam results in the forming of hydrogen on the cathode.

Generally, for a given operating point of the electrolyzer, there exists an electric current to be applied thereto, and the flow rate of steam to be introduced into the electrolyzer is calculated according to the intensity of the electric current applied to the electrolyzer. Since the current intensity may generally vary from 0 to 100% of the operating range of the electrolyzer, the vapor flow to be generated should also be able to linearly vary from 0 to 100% of the capacity, and should only be made of vapor. Further, an electrolyzer is a system very sensitive to current/gas flow rate inhomogeneities, such inhomogeneities being indeed capable of causing a premature aging of the electrolyzer. For example, if the vapor flow rate varies around its set point value, an instability of the operating point of the electrolyzer can be observed, resulting in variations of the cell voltage, which is a cause of premature aging.

Worse, strong variations of the vapor flow rate result in variations of the pressure by a few tens or hundreds of mbars, which may be sufficient to damage the seals or even crack the electrochemical cells. A vapor flow rate which is as homogeneous and regular as possible is thus desired.

Steam generators with a regulated flow rate, capable of generating high steam flow rates, that is, several tens of kg/hr, are available for sale. Such water generators are generally formed of a vapor storage under pressure coupled to a vapor flow regulation valve to generate the requested quantity of steam, and this, constantly.

Steam generators adapted to lower flow rate ranges, particularly between approximately 10 g/hr and 10 kg/hr, are also available for sale. Since vapor flow regulation valves used for large flow rates are not adapted for this flow rate range, a solution comprises regulating the flow rate of liquid water entering into the generator, so that the steam generated after evaporation corresponds to the quantity of vapor desired at the outlet.

According to an embodiment, such low flow rate generators use a heating tube or a volume having at least a heated lower portion, where a controlled quantity of water is injected and heated up to evaporation. It can however be observed that such generators cause vapor "puffs" and thus overpressures. Since the principle of evaporation of liquid water is rather complex if the constraint of regularity of the vapor flow rate at the outlet is taken into account, the difficulty in this solution is to control the heating of water to avoid for a local boiling of the water to drive part of the liquid into too hot an area and to be a source of runaway of the boiling reaction. The control of such phenomena being particularly difficult, in practice, low flow rate evaporators are generally only constructed to generate a single flow of dry vapor, that is, with no liquid phase, the electric power and the evaporation surface area are only studied for a single operating point.

According to another embodiment, other evaporators adapted for low flow rate ranges use a carrier gas, for example, nitrogen, which enables to ease the spreading of the liquid and to discharge the generated vapor. However, such a solution does enable to generate dry vapor since it is impossible to separate the vapor from the carrier gas.

Further, document WO 97/33479 describes a vapor generator comprising an enclosure covering a heating surface taking the shape of a cone. The cone is provided with a spiral-shaped groove, to conduct a liquid by gravity around the cone. The heating surface is heated by an electric resistance enabling to evaporate the liquid flowing in the groove. The vapor thus generated is extracted from the enclosure by a vapor outlet.

However, such a vapor generator does not enable to provide a regular vapor generation since vapor puffs are formed in the groove, that is, vapor overpressures which can exceed 100 mbars. Indeed, the heating surface is uniformly heated between 300 and 350° C. The water drops introduced through the liquid inlet port evaporate normally after a contact with the heating surface for a duration close to ten seconds. The water drops then slide on a vapor bed generated by the previous water drops. However, certain heavier water drops reach the heating surface by crossing the vapor bed and instantaneously evaporate by creating a local overpressure.

The technical problem solved by the disclosed embodiments is to provide a vapor generator capable of generating, at a constant pressure, a constant vapor flow of a liquid for small vapor flow rates, without requiring the use of a carrier gas.

SUMMARY OF THE SPECIFICATION

The described embodiments address this technical problem by using a heating surface integrating a liquid circulation corner piece, having a heat transfer pipe arranged therein. Thus, the liquid entirely covers the heat transfer pipe in the upper portion of the heating surface. Thereby, the contemplated embodiments enable to limit the phenomenon of water drops sliding on the vapor bed and a continuous evaporation of the liquid is obtained.

According to a first aspect, the disclosed embodiments concern a device for converting a liquid into vapor, operating at constant pressure, said device comprising:
an enclosure;
a heating surface with a downward slope arranged in said enclosure and defining a liquid flow path;
a liquid inlet port connected to an upper portion of said heating surface so that a liquid introduced from said liquid inlet port flows on said slope of said heating surface; and
a vapor outlet port formed through a wall of said enclosure.

The disclosed embodiments are characterized in that said heating surface comprises:

a heat transfer pipe configured to allow the flowing of a heat transfer fluid to heat said heating surface; and a corner piece comprising a U-shaped cross-section with a semi-circular portion arranged around said heat transfer pipe and an upper portion forming an opening on said enclosure.

The disclosed embodiments thus enable to achieve the evaporation of a liquid introduced through the liquid inlet port and contained in the corner piece around the heat transfer pipe. For this purpose, the liquid is heated by the heat transfer pipe, and then extracted in the form of vapor through the opening of the corner piece.

The linear thermal power applied to the heat transfer pipe is selected according to the length of the heating surface and to the thermal power necessary to evaporate all the liquid injected over time.

In other words, the implementation of the disclosed embodiments requires adjusting three parameters:

the slope of the heating surface to ensure a flowing of the liquid, particularly by gravity. It should for example be understood that if the liquid is directed towards a tank where it is stored for its evaporation by heating, it is difficult to accurately control the quantity of generated vapor. Due to the flow, each volume of injected liquid "individually" receives a quantity of heat in controlled fashion. The control of the quantity of vapor generated according to the quantity of injected liquid is thus eased;

the power of heating of the liquid by a heat transfer fluid flowing through the heat transfer pipe; and the length of the heating surface to obtain a complete evaporation of each mole of injected liquid before the end of the travel.

Such a device is thus capable of supplying a constant flow rate of dry vapor in the range from 10 g/hr to 10 kg/hr, and this without using either a carrier gas or an electromechanical element, such as a vapor flow control valve, for example. The use of a metallic corner piece for this generator enables to decrease the cost of material and the manufacturing cost with a simple implementation by bending.

For example, for a vapor flow rate in the range from 10 g/hr to 10 kg/hr, the maximum applied thermal power may be in the range from 8 to 12 kW and the length of the travel may be in the range from 10 to 20 meters. In practice, for a flow rate smaller than 300 g/hr, the liquid is preferably injected dropwise. For example, a flow rate in the order of 10 g/hr corresponds to approximately 1 drop of 36 µl of liquid every 13 seconds.

According to an embodiment, the diameter of said semi-circular portion of the corner piece is substantially equal to the diameter of the heat transfer pipe. Such an embodiment enables the liquid to be only in contact with the upper portion of the heat transfer pipe opposite the opening of the corner piece, thus limiting the risk of vapor puffs.

According to an embodiment, the corner piece is bent around the heat transfer pipe. This embodiment enables to limit the space between the semi-circular portion of the corner piece and the heat transfer pipe.

According to an embodiment, the heating surface forms a spiral. This embodiment enables to limit the volume of the heating surface and, thus, to limit the volume of the device for converting a liquid into vapor. Further, the spiral bending operation enables, on the one hand, to ensure a compactness of the device and, on the other hand, to maintain the metal tube at the back of the corner piece with no other fitting or welding operation.

According to an embodiment, the heating surface has a slope in the range from 1 to 4%. This embodiment enables to obtain an efficient tradeoff between the liquid flow velocity and the evaporation speed to limit the length of the heating area necessary to implement the evaporation of the liquid.

According to an embodiment, the corner piece comprises at least one groove extending on one side of the heat transfer pipe. This embodiment enables to form a capillarity channel to suck in the liquid introduced through the liquid inlet port.

The flow due to gravity combined with the flow due to capillarity particularly provides a uniform spreading of the liquid injected at the inlet port with a low flow rate, particularly dropwise, along a large length of the heating surface all along the travel. A continuous water filament is thus formed. The forming of a drop train on the heating surface being avoided, the vapor generation is thus more regular and the vapor flow rate at the outlet port is constant, even for a discontinuous water injection.

Such a solution enables to generate a regular vapor flow rate from a non-linear injection of liquid, particularly dropwise. Of course, the liquid inlet may also be size to allow an injection by capillarity of the liquid directly into the groove and avoid the forming of drops at the end of the liquid water injection pipe. According to an embodiment, the end of a liquid water injection pipe is in this case placed in contact with the groove.

According to an embodiment, the corner piece and/or the heat transfer pipe are made of a material neutral for the liquid, particularly stainless steel. Such an embodiment is particularly efficient to resist corrosion.

According to an embodiment, the enclosure comprises an insulating outer jacket and a temperature-controlled inner jacket. This embodiment enables to avoid condensation on the inner walls of the enclosure. Preferably, the inner jacket is sized and qualified to operate up to the maximum pressure defined on design of the vapor generator in the range from the atmospheric pressure to a few tens of bars.

According to an embodiment adapted to a production flow rate from 0 to 5 kg/hr at the atmospheric pressure, the inner jacket has a 220-millimeter diameter for a 470-millimeter height in a steel sheet having a 2-millimeter thickness. The corner piece and the heat transfer pipe have a linear length of 10 meters and are bent according to a 200-millimeter diameter and a 400 millimeter height. The volume where the vapor is present is approximately 12 liters.

According to an embodiment, the heat transfer pipe is configured to circulate a heat transfer fluid in a circulation direction inverse to the direction of a liquid in said corner piece. This embodiment enables to obtain a heat transfer pipe having more heat in the lower portion than in the upper portion of the device. As a result, the liquid is introduced on a heat transfer pipe having a temperature close to 100° C., which results in a slow evaporation. As the liquid flows down in the corner piece, the temperature of the heat transfer pipe increases, as well as the evaporation speed.

Further, although the described device enables to generate dry vapor, it is also possible to introduce, if need be, one or a plurality of gases to perform a mixture.

In this case, a previous heating of the gases is necessary before their introduction into the vapor. Such a previous heating may for example be obtained by a simple technique which comprises winding the gas line in a spiral in contact with the generator enclosure.

In the specific case where the energy of the heat transfer fluid is not sufficient to generate the necessary quantity of vapor, it is possible to add a complement in the form of electric power.

Such an input may be an additional heating of the fluid before its injection into the vapor generator. A heating resistor may thus be added on the heat transfer pipe before entering into the vapor generator, regulated at the temperature necessary to always guarantee that the quantity of heat of the heat transfer fluid is greater than the quantity of energy necessary to evaporate the liquid introduced at the inlet port.

According to an embodiment, the device comprises two portions:

an upper portion where the heat carrying tube is arranged in the semi-circular portion of the corner piece; and a lower portion where an electric heating resistor is arranged in the semi-circular portion of the corner piece.

Thus, if the flow rate to be evaporated is sufficiently low, it is only evaporated in the first area by the energy provided by the heat transfer fluid. If the flow rate exceeds the evaporation capacity of the first area, it arrives pre-heated onto the second area and the electric power completes the input necessary to achieve the evaporation. Further, the heat transfer fluid exits a very low temperature, and a large portion of the thermal energy of the heat transfer fluid has been used.

According to a second aspect, the disclosed embodiments concern a vapor generator comprising:

a liquid flow regulator capable of generating a constant liquid flow rate in the range from 0 to 10 kg/hr;

a device for converting liquid into vapor according to the first embodiment having its inlet port coupled to said liquid flow regulator; and an energy source capable of supplying a sufficient quantity of energy to the heating surface to heat the liquid.

BRIEF DESCRIPTION OF THE DRAWINGS

The present description will be better understood on reading of the following description provided as an example only in relation with the accompanying drawings, where the same reference numerals designate the same or similar elements, among which.

DETAILED DESCRIPTION

In the following description, expression "substantially" means with a tolerance of plus or minus 10%.

Figure 1:
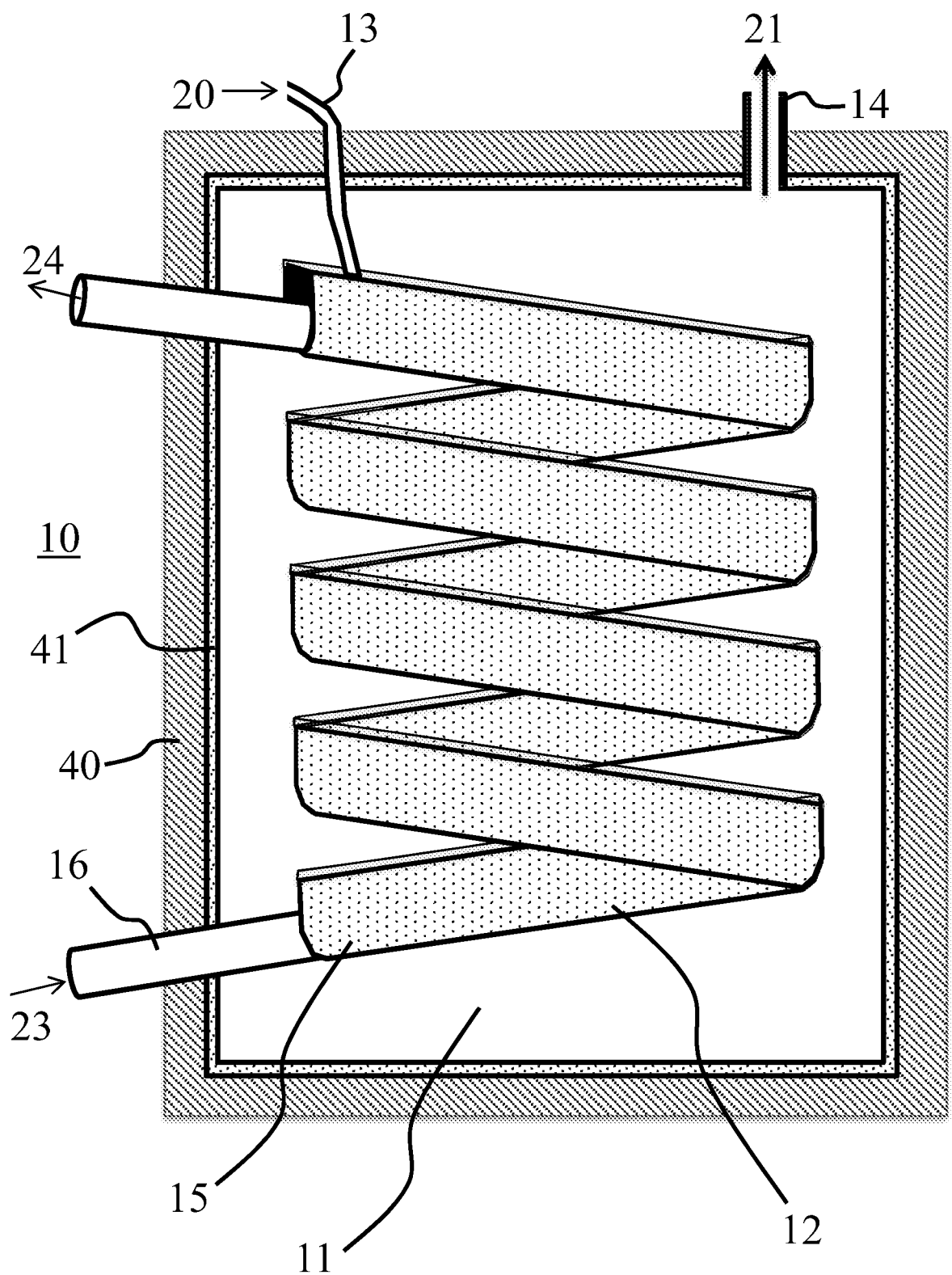
FIG. 1 is a simplified representation of a device for converting a liquid into vapor according to a first embodiment.

The structure of a device 10 for converting a liquid 20, particularly water, into vapor 21 according to a specific embodiment illustrated in FIG. 1 is described hereafter.

The conversion device is formed, in particular, of an enclosure 11 provided with a vapor outlet port 14 and with a liquid inlet port 13 intended to be coupled to a conventional water flow regulator (not shown). The liquid water flow regulator may be a regulator available for sale, for example, a thermal mass flow or Coriolis regulator.

Enclosure 11 is formed of a thermally-insulating outer jacket 40 and of an inner jacket 41 which enables to retain the vapor generated in enclosure 11 and to channel it onto vapor outlet port 14 so that it can be used. Inner jacket 41 is preferably made of a metallic material. Inner jacket 41 is heated to be maintained at a sufficient temperature, for example, 200° C., to avoid the appearing of condensate on the inner walls of enclosure 11. Inner jacket 41 also has the function of withstanding the maximum operating pressure of the vapor generator. For example, for a production flow rate from 0 to 5 kg/hr at the atmospheric pressure, inner jacket 41 has a 220-millimeter diameter for a 470-millimeter height in a steel sheet having a 2-millimeter thickness.

The inner volume of enclosure 11 being in connection, via vapor outlet port 14, with the outside, the inner pressure of enclosure 11 is set by the outer pressure. For example, vapor outlet port 14 is directly connected to the inlet of an electrolyzer operating at the atmospheric pressure, so that the inner pressure of enclosure 11 is equal to the atmospheric pressure, and thus substantially constant. Of course, the outer pressure, which sets the inner pressure of enclosure 11, may be different, particularly greater. Similarly, a pressure regulator may be provided to directly regulate the inner pressure of enclosure 11 to obtain a substantially constant pressure.

An open heating surface 12 of helical shape, for compactness reasons, is arranged in enclosure 11. Heating surface 12 is formed by a corner piece 15 having a U-shaped cross-section, with a semi-circular portion 17 and an upper portion 19 forming an opening 18 on enclosure 11. Preferably, corner piece 15 is made of stainless steel and rests on a support base of enclosure 11. In particular, the support base is horizontal, that is, substantially perpendicular to the direction of gravity.

Heating surface 12 has a downward slope, for example, between 1 and 4%, which allows a flow by gravity of liquid water 20 from liquid inlet port 13.

Further, a heat transfer pipe 16 is arranged in semi-circular portion 17 of corner piece 15. Heat transfer pipe 16 has a round cross-section adapted to semi-circular cross-section 17 of corner piece 15 so as to be positioned at closest to the back of corner piece 15. Heat transfer pipe 16 is further intended to heat up liquid 20 flowing through corner piece 15 to take it to its evaporation temperature. In practice, to efficiently transmit the thermal energy to the liquid to be evaporated, the surface area of contact between heat transfer pipe 16 and liquid 20 should be large. According to an embodiment comprising a 10-meter long heat transfer pipe 16 having an 8-millimeter diameter, the contact surface area is estimated to be 12 dm$^2$.

Figure 2A:
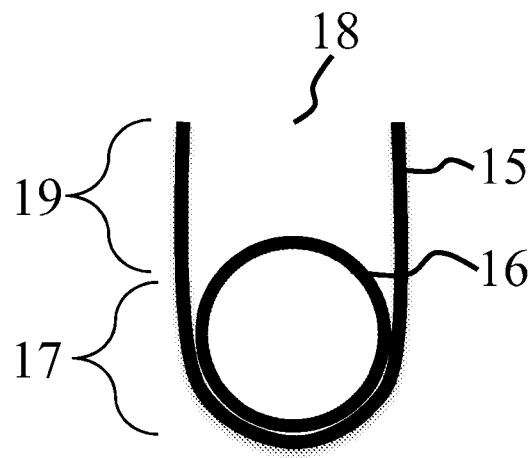
FIGS. 2a and 2b are simplified representations of a cross-section of the heating surface of FIG. 1 before and after bending.
Figure 2B:
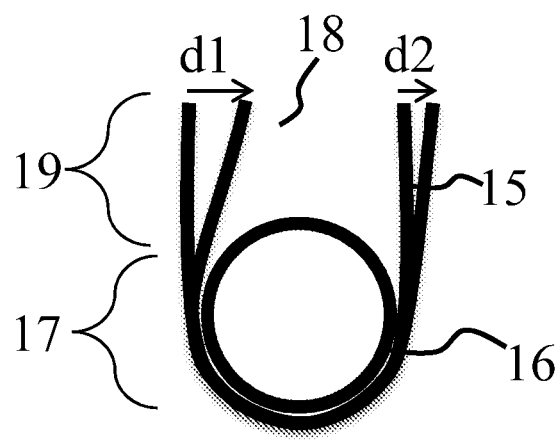

More particularly, as illustrated in FIGS. 2a and 2b, corner piece 15 is bent around heat transfer pipe 16. For this purpose, heat transfer pipe 16 is inserted into the back of corner piece 15 such as illustrated in FIG. 2a. As illustrated in FIG. 2b, upper portion 19 of corner piece 15 narrows along directions d1 and d2 during the bending operation, so that heat transfer pipe 16 is trapped in semi-circular portion 17 of corner piece 15.

As a variation, lower portion 17 of corner piece 15 may comprise a groove to allow a flow of liquid 20 by capillarity. The flow by capillarity is particularly advantageous in the case of a low liquid flow rate 20, and particularly in the case where liquid 20 is injected dropwise. The flow by capillarity indeed enables to uniformly spread liquid 20 to be evaporated on heating surface 12, with no forming of a drop train, guaranteeing a regularity of the vapor flow rate at the output.

For example, liquid inlet port 13 may be a stainless steel pipe positioned in contact with corner piece 15 and with heat transfer pipe 16, and sized to authorize a sucking in by capillarity of liquid 20 into corner piece 15, with no forming of drops.

Of course, according to the type of injection of liquid 20, dropwise or continuous, and to the liquid flow rate to be introduced, it is possible to form the device without the groove. In this case, liquid 20 only flows by gravity.

As a variation, heat transfer pipe 16 may take other shapes without modifying the contemplated embodiments.

Figure 3:
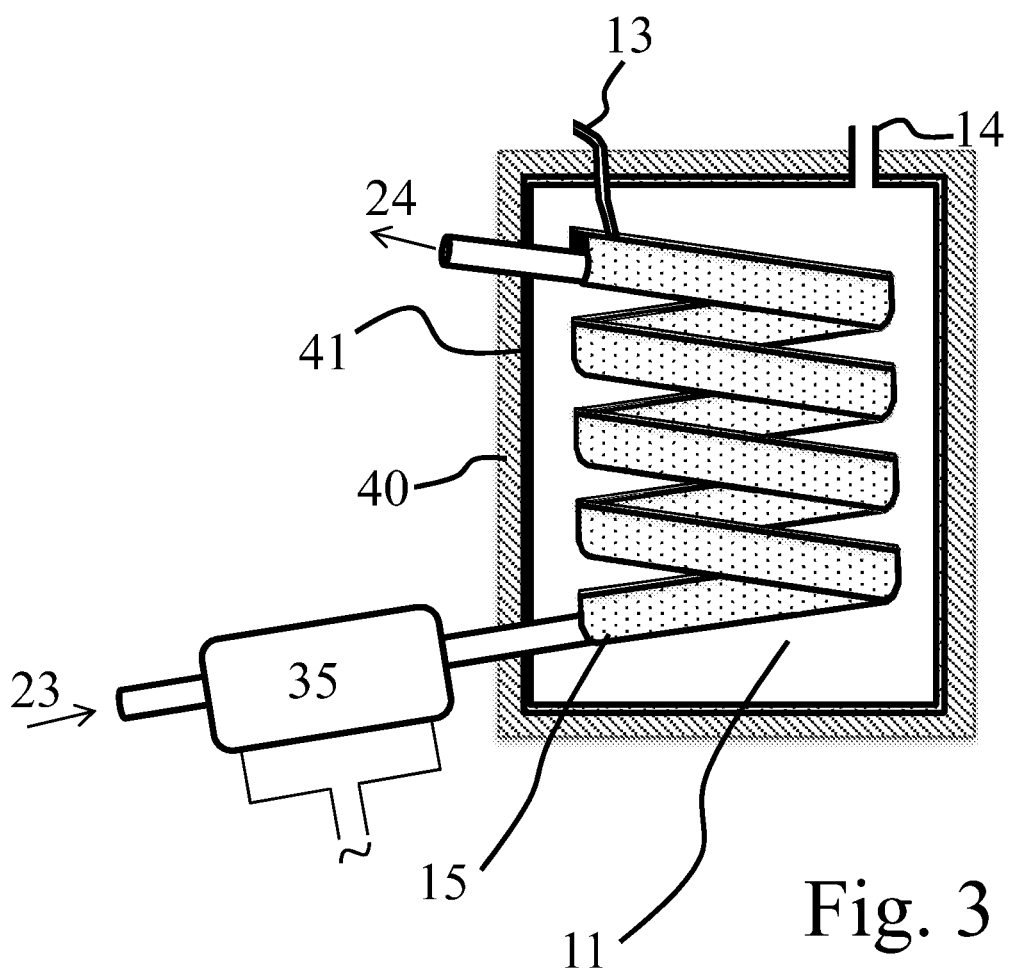
FIG. 3 is a simplified representation of a device for converting a liquid into vapor according to a second embodiment.

According to another variation, illustrated in FIG. 3, heat transfer pipe 16 is heated by an electric heating source 35 before penetrating into enclosure 11. Complementary heating source 35 may take the form of a resistor surrounding heat transfer pipe 16.

Figure 4:
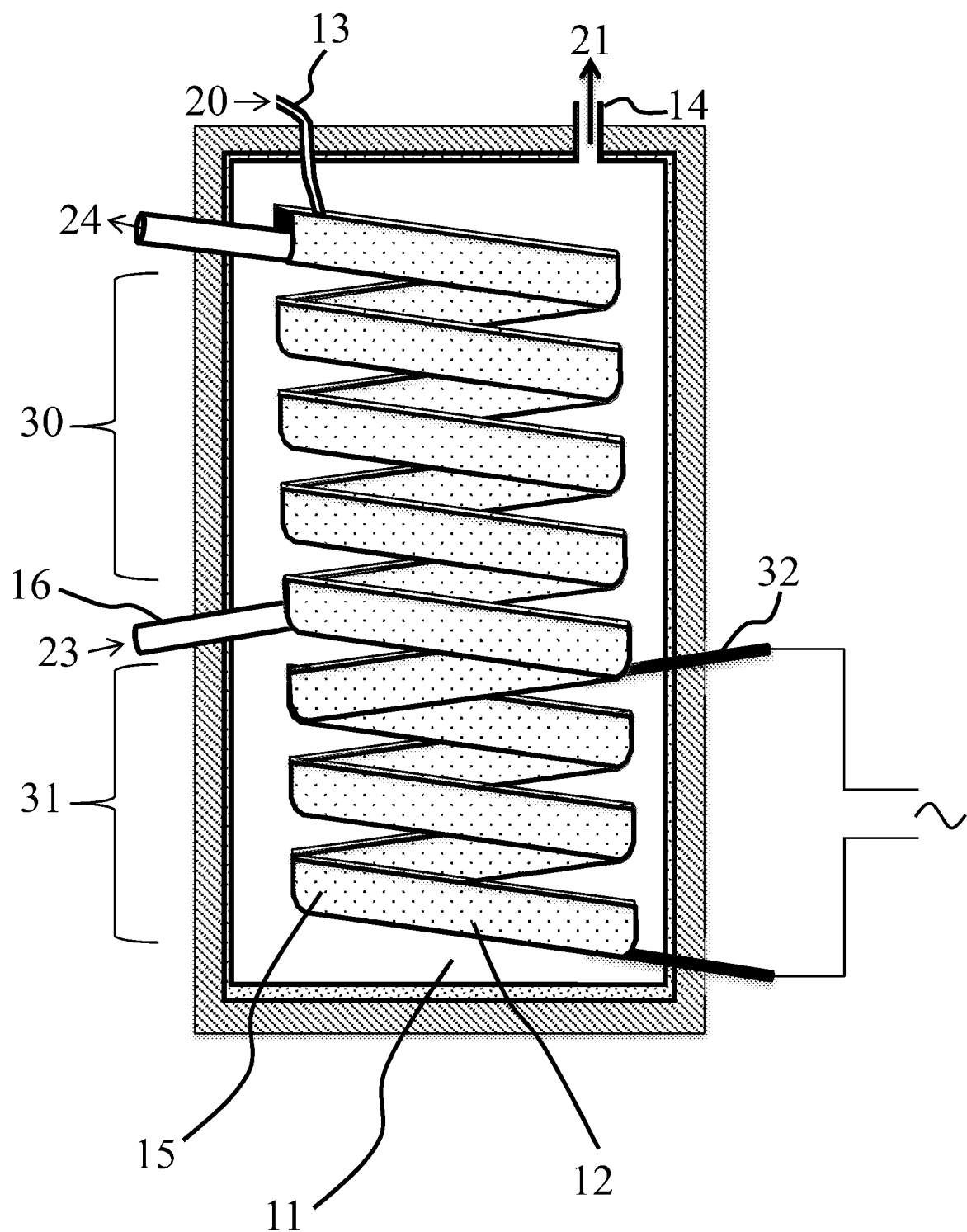
FIG. 4 is a simplified representation of a device for converting a liquid into vapor according to a third embodiment.

According to another variation illustrated in FIG. 4, heating surface 12 comprises two different heating means. An upper portion 30 of heating surface 12 is heated by heat transfer pipe 16 and a lower portion 31 of heating surface 12 is heated by a heating resistor 32. To achieve this, in lower portion 31, the back of corner piece 15 comprises a groove having heating resistor 32 inserted therein. The groove is opened and sized to allow the insertion by caulking of heating resistor 32 and a flow by capillarity of the liquid in corner piece 15. For example, for a heating surface having a 3.5-millimeter diameter and a flow rate range from 0 to 5 l/hr, corner piece 15 has a 8.5-millimeter height for a 17-millimeter width and the groove has a height and a width of 3.5 millimeters, allowing the caulking of wire-shaped electric resistor 32.

Heating resistor 32 is further coupled to a voltage source regulated to supply the energy necessary to the heating of the water during its descent along corner piece 15 until its evaporation.

The generated vapor 21 is then discharged at the periphery via opening 18 of corner piece 15 without disturbing the flow to guarantee a regularity in the heating operation.

To ensure an efficient evaporation of all the liquid 20 introduced into corner piece 15 with or without boiling, it is necessary to homogeneously heat up liquid 20. In practice, the temperature of heat transfer pipe 16 is calibrated to ensure a temperature rise, preferably regular, of a given quantity of water in corner piece 15 until its total evaporation before the end of the travel.

The energy power of the heat transfer fluid flowing in heat transfer pipe 16 may be optimized according to the quantity of water to be introduced, to distribute the water all along corner piece 15 and to have a very stable vapor generation with a minimum energy expenditure. Such an optimization may be performed by calculating the energy necessary for the heating of the water, and then for its vaporization, while taking thermal losses into account.

In practice, a maximum flow rate of liquid 20 to be injected into corner piece 15 is defined, for example, 10 kg/hr. Such a maximum flow rate defines a maximum quantity of liquid 20 to be evaporated, here 10 kg. The total thermal power necessary to vaporize this maximum quantity of liquid 20 is calculated, by of course taking into account the initial temperature of liquid 20 and the pressure under which the heating is performed. For example, the total thermal power may be calculated to take the liquid water from 20° C. to an overheated vapor state at 150° C. at the atmospheric pressure. Such a calculation is for example performed according to the following relations:

$$P = \dot{m} \cdot Cp_1 \cdot (100-20) + \dot{m} \cdot L + \dot{m} \cdot Cp_2 \cdot (150-100)$$

$$P = \dot{m} \cdot (Cp_1 \cdot (100-20) + L + Cp_2 \cdot (150-100))$$

$$P = \dot{m} \cdot (4195 \cdot (100-20) + 2{,}258 \cdot 10^6 + 2030 \cdot (150-100))$$

$$P = \dot{m} \cdot 2695100$$

$$P = 2.77 \cdot 10^{-3} \cdot 2695100$$

$$P = 7486 \ W$$

with:
P: Minimum necessary thermal power [W];
$\dot{m}$: water mass flow rate [$2.77 \cdot 10^{-3}$ kg/s];
$Cp_1$: Mean specific heat of water between 20° C. and 100° C. [4,195 J/(kg·K)];
$Cp_2$: Mean specific heat of steam between 100° C. and 150° C. [2,030 J/(kg·K)];
L: Latent heat of water vaporization [$2.258 \cdot 10^6$ J/(kg·K)].

According to an embodiment, the energy power of the heat transfer fluid flowing in heat transfer pipe 16 will preferably be selected with at least 30% of the additional heating capacity to have a better reactivity during changes of evaporation instructions. In the disclosed case of a vapor production flow rate of 10 kg/hr, the power recommended for heating surface 12 is (1.3. P)=9,732 W, rounded up to 10 kW.

The length of heating surface 12 is calculated to limit the linear thermal power within the limit of the efficiency of the linear thermal transfer to the liquid water, preferably in the range from 0.5 to 1 kW/m. In the disclosed case of a vapor generation rate of 10 kg/hr, that is, a 10-kW total power, the length recommended for heating surface 12 is thus in the range from 10 to 20 meters.

In other words, the method of calculating the linear thermal power particularly comprises:
defining a maximum flow rate of liquid 20 to be injected, such a maximum flow rate providing the maximum quantity of liquid to be evaporated;
calculating the total thermal power necessary to vaporize this maximum quantity of liquid, that is, to raise the temperature of the quantity of liquid by an initial temperature to at least its evaporation temperature, to achieve the actual evaporation, and to overheat the generator vapor; and
calculating the linear thermal power to be generated for a travel length equal to the maximum length of the travel.

For example, the minimum total heating power P necessary to vaporize a quantity of liquid 20 may in particular be obtained by the sum of energy $P_1$ necessary to heat this quantity of liquid up to its boiling temperature, of energy $P_2$ for carrying out the actual vaporization, and of energy $P_3$ for overheating the generated vapor:

$$P = P_1 + P_2 + P_3$$

In particular, the calculation of the power necessary to take a given flow rate of the liquid from an initial temperature to a final temperature, for example, its evaporation temperature, is for example provided by relation:

$$P_1 = \dot{m} \cdot Cp_1 \cdot \Delta T_1$$

with:
$P_1$ the power in Watt [W];
$\dot{m}$ has the flow rate of liquid to be heated [kg/s];
$Cp_1$ the mass thermal capacity at a constant pressure of the liquid [J/(kg·K)];
$\Delta T_1$ the temperature difference between the final temperature to be reached and the initial temperature [K].

The calculation of the power necessary to vaporize a given liquid flow rate is for example given by relation:

$$P_2 = \dot{m} \cdot L$$

with:
P₂ the power in Watt [W];
ṁ the flow rate of liquid to be heated [kg/s];
L the latent mass heat of vaporization at constant pressure of the liquid [J/kg].

The calculation of the power necessary to overheat a given flow rate of the liquid from an initial temperature to a final temperature, for example, up to a temperature greater by 50° C. than the evaporation temperature, is for example provided by relation:

$$P_3 = \dot{m} \cdot Cp_3 \cdot \Delta T_3$$

with:
$P_3$ the power in Watt [W];
ṁ the flow rate of vapor to be re-heated [kg/s];
$Cp_3$ the mass thermal capacity at a constant pressure of the vapor [J/(kg·K)];
$\Delta T_3$ the temperature difference between the final temperature to be reached and the initial temperature [K].

Of course, this relation may be weighted by taking into account possible heat losses, preferably by adding a minimum margin of 30% to the total power.

Thus, water 20 to be evaporated is introduced into corner piece 15 via liquid inlet port 13 and flows into corner piece 15, by gravity and/or by capillarity. Water 20 heats during its descent until it evaporates. Vapor 21 is discharged through opening 18 of corner piece 15 without disturbing the flow, which guarantees the regularity of the operation.

According to a variation, it is possible to provide a regulation of the energy power of the heat transfer fluid flowing through heat transfer pipe 16. For example, it is possible to couple a temperature sensor with a voltage regulator. The temperature sensor, for example, a thermocouple, measures the temperature of the heat transfer fluid flowing in heat transfer pipe 16 at the level of outlet port 24 of the heat transfer fluid. The temperature of the heat transfer fluid at inlet port 23 of heat transfer fluid 16 is then adjusted according to this measured temperature and to a reference temperature corresponding to the thermal power necessary to vaporize the water. In practice, a table or a diagram giving the correspondences between the temperature, the water flow rate, and the temperature of the heat transfer fluid to be supplied is available.

Preferably, the heat transfer fluid flows in heat transfer pipe 16 in the direction opposite to that of liquid flow 20 in corner piece 15.

Thus, the evaporator provided by the present disclosure is adapted to generating small vapor flow rates, particularly flow rates in the range from 10 g/hr to 10 kg/hr, and does not require using a carried gas.

In particular, the provided evaporator enables to generate dry vapor at a constant pressure, and the vapor flow rate desired at the outlet port is simply obtained by a regulation of the liquid flow rate at the inlet port. In particular, it is possible to combine the dropwise injection of liquid and the generation of a regular vapor flow rate.

The invention claimed is:

1. A device for converting a liquid into vapor, said device comprising:
    an enclosure;
    a heating surface with a consistently downward slope arranged in said enclosure and defining a liquid flow path;
    a liquid inlet port connected to an upper portion of said heating surface so that the liquid introduced from said liquid inlet flows on said slope of the heating surface; and
    a vapor outlet port formed through a wall of the enclosure;
    wherein the heating surface comprises:
        a heat transfer pipe configured to allow the flowing of a heat transfer fluid heating said heating surface; and
        a channel piece comprising a U-shaped cross-section with a semi-circular portion arranged around said heat transfer pipe and an upper portion forming an opening on said enclosure; and
    wherein the heat within the enclosure enters the enclosure via the heat transfer fluid.

2. The device for converting a liquid into vapor of claim 1, wherein a diameter of the semi-circular portion of the channel piece is substantially equal to the diameter of the heat transfer pipe.

3. The device for converting a liquid into vapor of claim 2, wherein the channel piece is bent around the heat transfer pipe.

4. The device for converting a liquid into vapor of claim 1, wherein the heating surface forms a spiral.

5. The device for converting a liquid into vapor of claim 1, wherein the heating surface has a slope in the range from 1 to 4%.

6. The device for converting a liquid into vapor of claim 1, wherein the channel piece comprises at least one groove extending on one side of the heat transfer pipe.

7. The device for converting a liquid into vapor of claim 1, wherein the channel piece and/or the heat transfer pipe are made of a material neutral for the liquid.

8. The device for converting a liquid into vapor of claim 7, wherein the channel piece and/or the heat transfer pipe are made of stainless steel.

9. The device for converting a liquid into vapour of claim 7, wherein the material neutral for the liquid is stainless steel.

10. The device for converting a liquid into vapor of claim 1, wherein the enclosure comprises an insulating outer jacket and a temperature-controlled inner jacket.

11. The device for converting a liquid into vapor of claim 1, wherein the heat transfer pipe is configured to circulate a heat transfer fluid in a circulation direction inverse to the direction of a liquid in the channel piece.

12. The device for converting a liquid into vapor of claim 1, wherein said device comprises two portions:
    an upper portion where the heat transfer pipe is arranged in the semi-circular portion of the channel piece; and
    a lower portion where an electric heating resistor is arranged in the semi-circular portion of the channel piece.

13. A vapor generator comprising:
    a liquid flow regulator capable of generating a constant liquid flow rate in the range from 0 to 10 kg/hr;
    the device for converting liquid into vapor of claim 1, the inlet port of the device coupled to said liquid flow regulator; and
    an energy source capable of supplying a sufficient quantity of energy to the heating surface of the conversion device to heat the liquid.

14. The vapor generator of claim 13, further comprising a source for heating the heat transfer pipe of the conversion device, arranged on an inlet port of heat transfer fluid of said heat transfer pipe.

15. A device for converting a liquid into vapor, said device comprising:
    an enclosure into which heat is introduced by a heat transfer fluid;

a heating surface formed as an open channel having a U-shaped cross-section and forming a helix extending downward from an upper portion of the heating surface at a top of the enclosure;

a heat transfer pipe configured to provide heat to the heating surface via the heat transfer fluid flowing therein, the heat transfer pipe disposed within the channel of the heating surface, having a cross-section complementary to the U-shaped cross-section of the heating surface, and further having a helical shape corresponding to that of the heating surface such that the heating surface and the heat transfer pipe are in contact over at least the upper portion of the heating surface;

a liquid inlet port connected to the upper portion of the heating surface such that a liquid introduced through said liquid inlet port flows, by gravity, within the channel formed by the heating surface and around the heat transfer pipe from the upper portion to a lower portion of the heating surface; and a vapor outlet port formed through a wall of the enclosure.

16. A device according to claim 15, further comprising an electrolyzer having an inlet coupled to the vapor outlet port and operating at atmospheric pressure such that an inner pressure of the enclosure is equal to the atmospheric pressure.

17. A device according to claim 15, wherein the heating surface extends downward with a constant slope over a majority of its helical length.

18. A device according to claim 17, wherein the constant slope is between 1% and 4%.

19. A device according to claim 15, wherein the heat transfer pipe includes an inlet port and an outlet port, the inlet and outlet ports arranged such that the flow of heat transfer fluid through the heat transfer pipe is against gravity.

* * * * *